United States Patent [19]

Foster

[11] Patent Number: 4,712,467

[45] Date of Patent: Dec. 15, 1987

[54] COMBINED LINEAR HYDRAULIC MOTOR AND TRANSFER VALVE

[76] Inventor: Raymond K. Foster, P.O. Box 1, Madras, Oreg. 97741

[21] Appl. No.: 905,098

[22] Filed: Sep. 8, 1986

[51] Int. Cl.$^4$ .................. F01B 15/00; F15B 15/22
[52] U.S. Cl. .................... 91/176; 91/189 R; 91/192; 91/395; 91/520; 92/110; 92/117 A
[58] Field of Search ............... 91/20, 27, 167 R, 168, 91/176, 189 R, 189 A, 192, 395, 520; 92/110, 117 R, 117 A, 151

[56] References Cited

U.S. PATENT DOCUMENTS

| | | | |
|---|---|---|---|
| 1,977,696 | 10/1934 | Purdy | 198/218 |
| 2,550,925 | 5/1951 | Weimar | 309/4 |
| 2,629,504 | 2/1953 | Peterson | 214/83.3 |
| 2,922,399 | 1/1960 | Panissidi et al. | 92/110 |
| 2,973,856 | 3/1961 | Brooks | 198/219 |
| 3,534,875 | 10/1970 | Hallstrom, Jr. | 214/83.3 |
| 3,905,290 | 9/1975 | Caughey | 100/215 |
| 3,998,132 | 12/1976 | Rasigade | 91/395 |
| 4,143,760 | 3/1979 | Hallstrom | 198/750 |
| 4,144,963 | 3/1979 | Hallstrom | 198/750 |
| 4,184,587 | 1/1980 | Hallstrom | 198/750 |
| 4,474,285 | 10/1984 | Foster | 198/750 |
| 4,492,303 | 1/1985 | Foster | 198/750 |
| 4,508,211 | 4/1985 | Foster | 198/750 |
| 4,580,678 | 4/1986 | Foster | 98/750 |

FOREIGN PATENT DOCUMENTS 1296087 5/1969 Fed. Rep. of Germany .
2275669 1/1976 France ............... 91/189 R
500673 2/1939 United Kingdom ........... 91/189

Primary Examiner—Robert E. Garrett
Assistant Examiner—Mark A. Williamson
Attorney, Agent, or Firm—Delbert J. Barnard

[57] ABSTRACT

Piston rods of three linear hydraulic motors are connected at their outer ends to two spaced apart transverse frame members. A cylinder housing is driven back and forth along each pair of piston rods. Three transverse drive beams are provided. Each drive beam is directly connected to an associated one of the cylinder housings. Three sets of floor slat members are provided. Each set is connected to an associated one of the transverse drive beams. The linear hydraulic motors are operated for moving the floor slat members in one direction, for advancing a load, and for retracting them in an opposite direction. Each cylinder housing has four fluid chambers. First and third chambers are interconnected and the second and fourth chambers are interconnected. This arrangement provides adequate force producing area with a relatively small diameter cylinder housing. Fluid passageways are formed in the piston rods. Transfer valves are incorporated in end portions of some of the linear hydraulic motors. Each transfer valve includes an actuator rod which extends through the passageway in its piston rod. U-shaped tubes are clamped onto the outer end portions of the piston rods by means of clamp plates and interconnecting nut and bolt assemblies.

5 Claims, 11 Drawing Figures

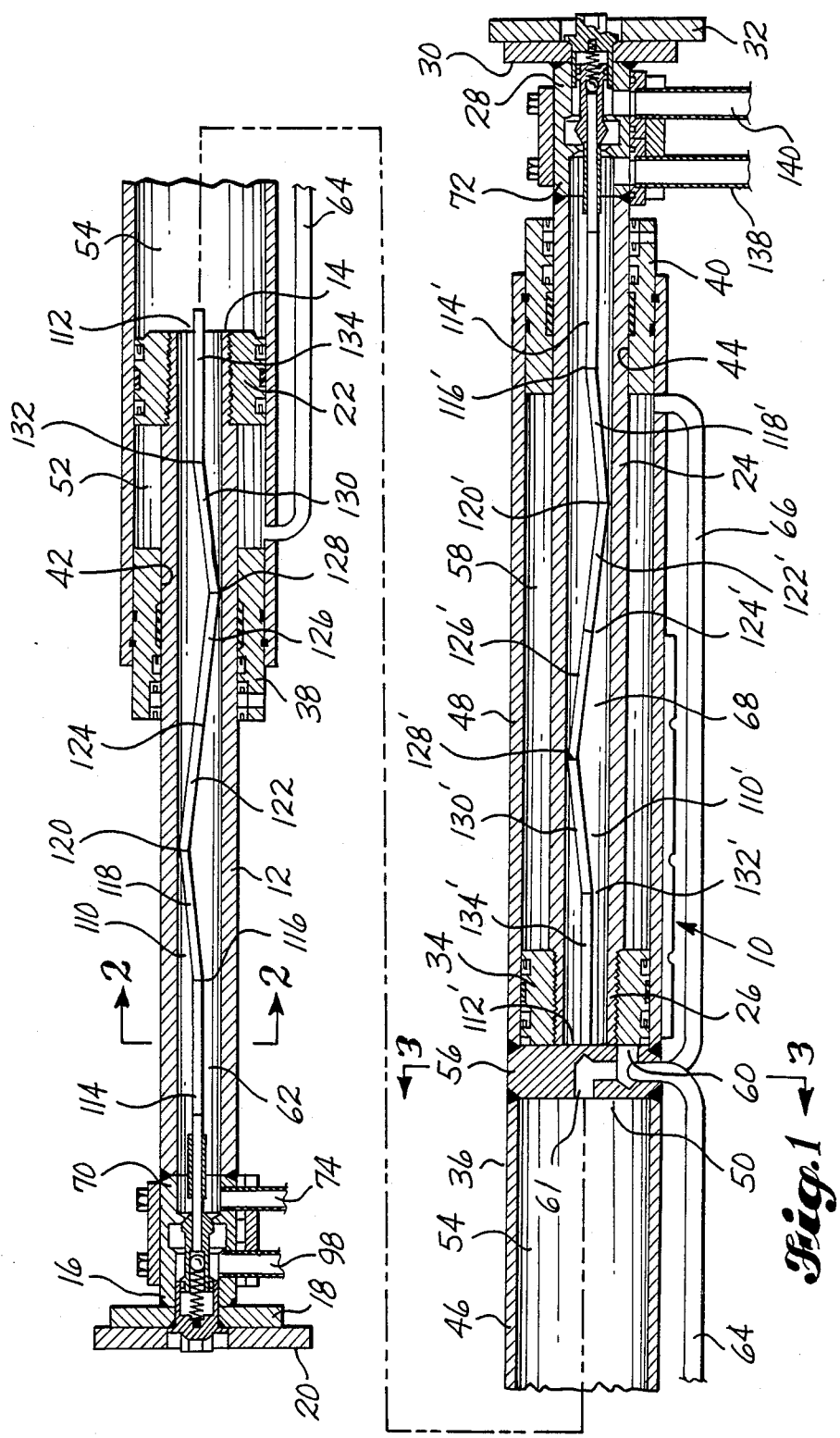

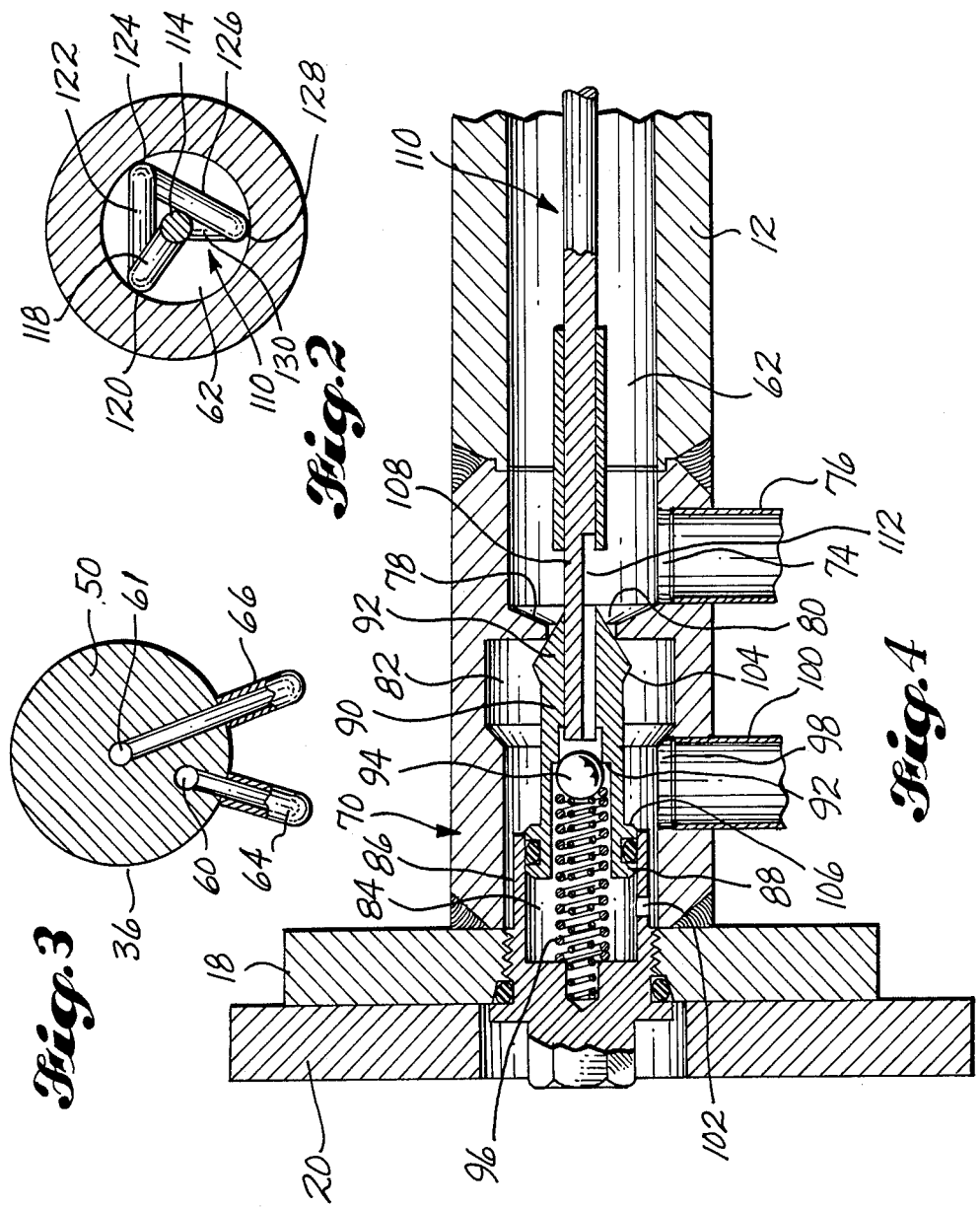

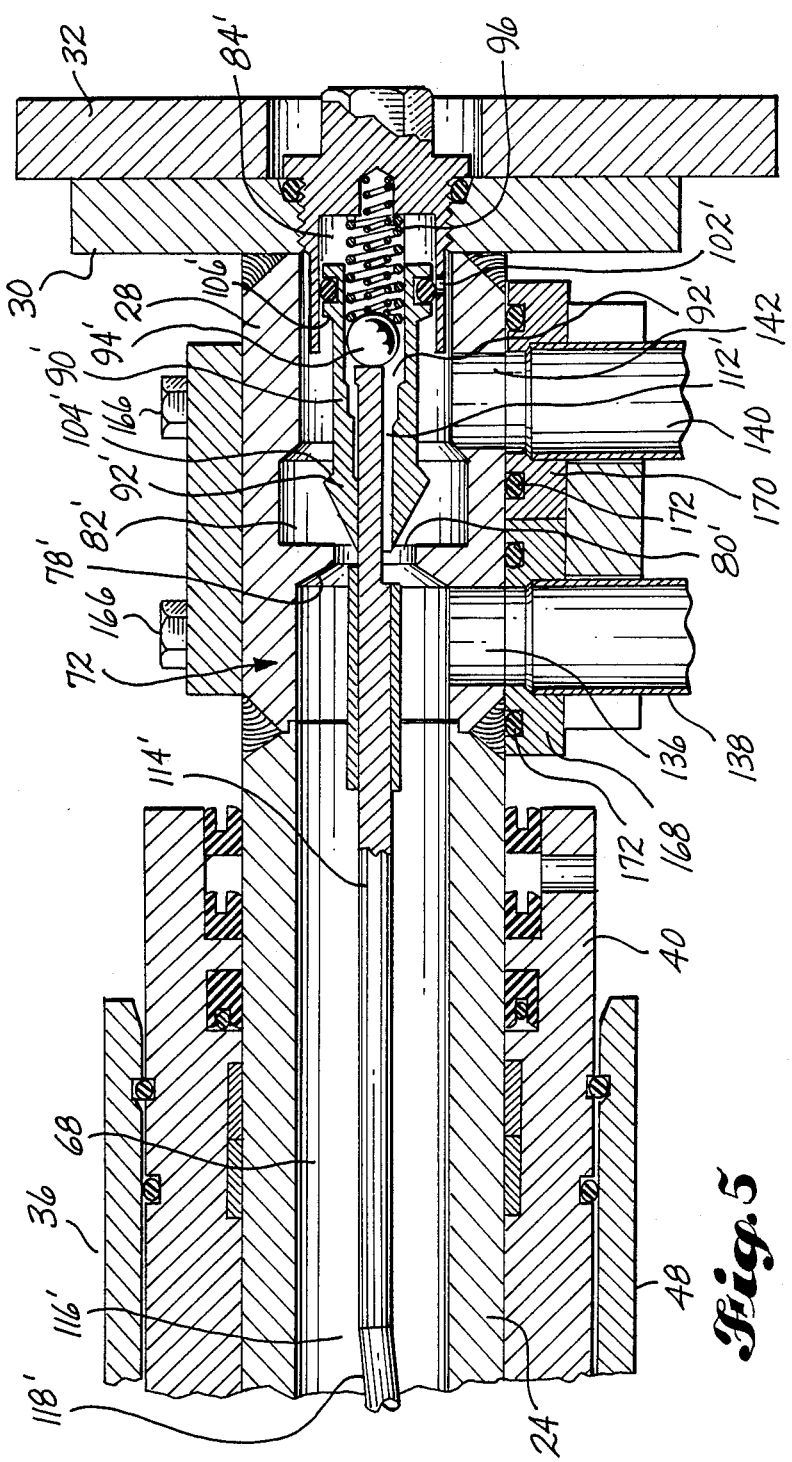

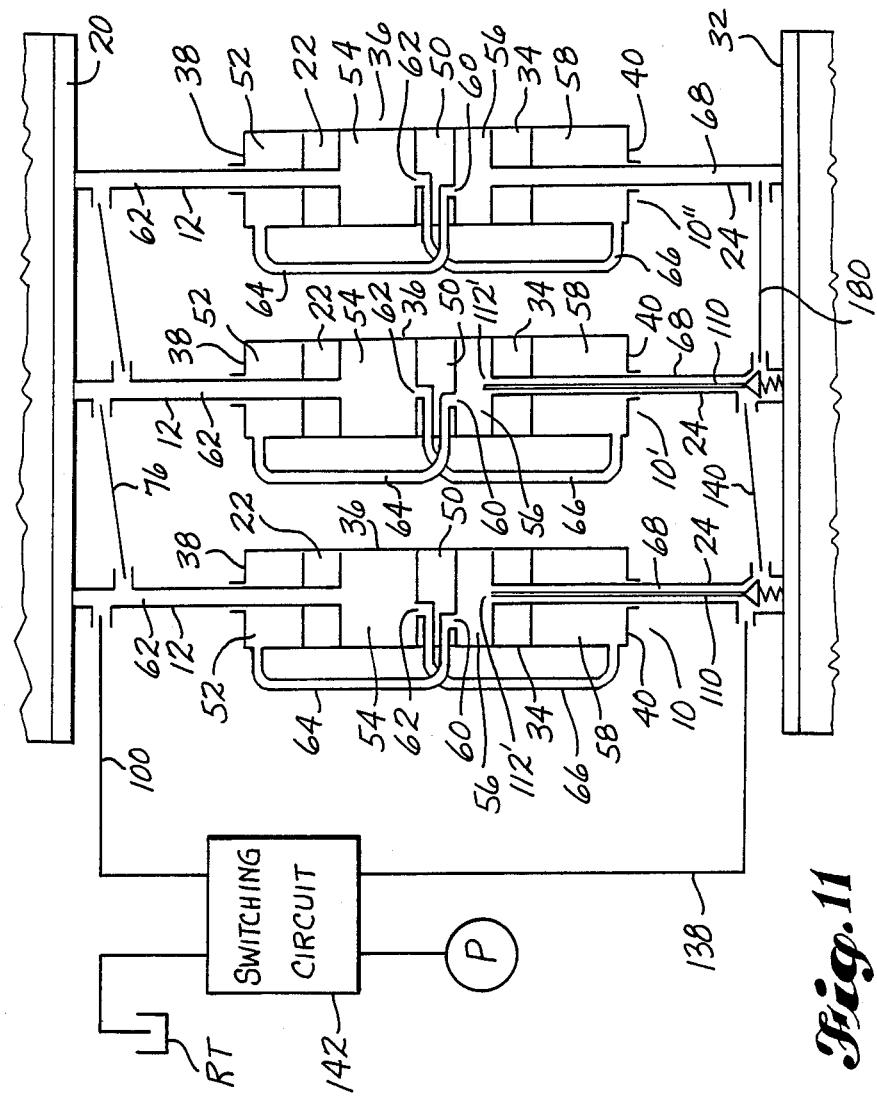

4,712,467

COMBINED LINEAR HYDRAULIC MOTOR AND TRANSFER VALVE

DESCRIPTION

1. Technical Field

This invention relates to improvements in linear hydraulic motors. In particular, it relates to the provision of a reduced diameter linear hydraulic motor and an internal transfer valve.

2. Background Art

The linear hydraulic motor of the present invention is particularly suited for use in a reciprocating floor conveyor, but is believed to have general utility.

Reciprocating floor conveyors are a relatively recent development. Basically, they comprise at least one group of at least three elongated floor members and a hydraulic drive system which operates to drive at least a majority of the floor members in unison in the desired conveying direction, and to retract them individually. Systems are in use in which all of the floor members are driven in unison, in the desired conveying direction, and are then individually retracted sequentially. It is also been proposed to drive a majority of the floor slat members in the desired conveying direction while at the same time retracting the remaining floor slat members. The present invention has application with both types of systems.

For background purposes, reference is made to U.S. Pat. No. 4,143,760, granted Mar. 19, 1979; U.S. Pat. No. 4,144,963, granted Mar. 30, 1969; U.S. Pat. No. 4,184,587, granted Jan. 22, 1980; all to Olaf A. Hallstrom. Reference is also made to my U.S. Pat. Nos. 4,474,285; 4,492,303; 4,508,211; 4,580,678; and to my copending application Ser. No. 477,767 Reduced Size Drive/Frame Assembly for Reciprocating Floor Conveyor, filed Dec. 11, 1984. Application Ser. No. 477,767 was published under the Patent Cooperation Treaty as International Publication No. WO84,03686, on Sept. 27, 1984. The system is also prior art by the fact of its sale and commercial use.

Earlier forms of reciprocating floor conveyors are disclosed by U.S. Pat. No. 2,629,504, granted in February of 1953 to Peterson; by U.S. Pat. No. 2,973,856, granted in March of 1961 to Brooks; by U.S. Pat. No. 3,534,875, granted in October of 1970 to Hallstrom; by U.S. Pat. No. 3,905,290, granted Sept. 16, 1975 to Robert A. Caughey; and by West German Patent Publication No. 1,296,087, published in May of 1969. These patents are not particularly pertinent to the subject invention and require no further comment.

DISCLOSURE OF THE INVENTION

The present invention provides a relatively small diameter linear hydraulic motor capable of generating a substatial force which includes an internal transfer valve.

The combined linear hydraulic motor and transfer valve of the invention includes first and second piston rods, each of which has an inner end and an outer end. A first piston head is provided at the inner end of the first piston rod and a second piston head is provided at the inner end of the second piston rod. In use, the piston rods are fixed in position, with their piston heads being spaced apart. The cylinder housing is mounted to travel on the first and second piston heads. The cylinder housing has first and second end members. Each end member includes a central opening through which its piston rod extends. The cylinder housing also includes a divider wall between its ends. A first fluid chamber is formed within the cylinder housing between the first end member and the first piston head. A second fluid chamber is formed within the cylinder housing between the first piston head and the divider wall. The third fluid chamber is formed within the cylinder housing between the divider wall and the second piston head. A fourth fluid chamber is formed within the cylinder housing between the second piston head and the second end wall. The divider wall includes a first passageway having an inner end communicating with the third fluid chamber, and an outer end. The divider wall also includes a second passageway having an inner end communicating with the second fluid chamber, and an outer end. First conduit means extends through the first piston rod and has an inner end in communication with the second fluid chamber, and an outer end. A second conduit means is interconnected between the first fluid chamber and the outer end of the first passageway in the divider wall. A third conduit means is interconnected between the outer end of the second passageway in said divider wall and the fourth fluid chamber. A fourth conduit extends through the second piston rod and has an inner end in communication with the third fluid chamber, and an outer end. The second piston rod includes a pair of spaced apart sidewall ports adjacent its outer end. These ports communicate with the fourth conduit means. The second piston rod includes a transverse wall inside the fourth conduit means which is positioned axially between the two sidewall ports. A transfer port is provided in the transverse wall. A valve plug member is positioned within the fourth conduit means axially outwardly of the transport port. The valve plug member includes a plug end portion directed toward the transfer port. A spring means is positioned endwise outwardly of the valve plug member. The spring means biases the plug end portion of the valve plug member into seated engagement with the transfer port. An elongated actuator rod means extends through the fourth conduit means, from the valve plug member to the inner end of the fourth conduit means. The actuator rod means has an inner end portion which projects into the third fluid chamber, into a position to be contacted by the divider wall when fluid is being removed from the third fluid chamber and the divider wall is moving towards the second piston head. Contact of the divider wall with the inner end of the rod causes the rod to move endwise outwardly. The transfer valve further includes means responsive to the outward movement of the actuator rod for unseating the valve plug to open the transfer port and communicate each of the sidewall ports with the other, via the transfer port.

In preferred form, the valve plug member includes a central axial passageway. This passageway includes an outwardly facing valve seat intermediate its ends. A check valve closure element is positioned in the passageway outwardly of the valve seat. A spring means normally biases the check valve closure element in a seated position against the valve seat. The outer end portion of the actuator rod extends into the passageway in the valve plug member, towards the check valve closure element. The outward movement of the actuator rod means moves the actuator rod means against the check valve closure element, unseating such check valve closure element. This communicates a region that is endwise outwardly of the valve plug member with the sidewall port in the second piston rod which is located on the inner side of the transfer port, via the axial passageway in the valve plug member. The valve plug member includes an area differential resulting in elevated pressure at the sidewall port on the outside of the transfer port acting on the area differential, to move the valve plug member axially outwardly, to open the transfer port.

In preferred form, a tubular socket is provided in the end portion of the second piston rod, aligned axially with the second piston rod. The valve plug member includes an outer end portion which is slidably received within this socket. The spring is located within the socket. There is a passageway means communicating the region of the socket outwardly of the valve plug member with the sidewall port that is outwardly of the transverse wall.

Also in preferred form, the elongated actuator rod means has a cross sectional dimension which is substantially smaller than the cross sectional dimension of the fourth conduit means. The elongated actuator rod means has coaxial inner and outer end portions which are substantially centered within the fourth conduit means. The actuator rod means includes bent portions between the end portions which make contact wtih inner wall portions of the fourth conduit means, for supporting said end portions in substantially centered positions in the fourth conduit means.

In preferred form the actuator rod means includes a portion extending from its inner end portion outwardly to a point of substantial contact with the inner wall of the fourth conduit means. This is followed by a second portion which extends from the first point over to a second point of substantial contact spaced both axially and angularly from the first point. A third section extends from the second point to a third point of substantial contact point both axially and angularly from both the first and second points. A fourth portion extends from the third point to the outer end portion.

Other more detailed features of the invention are hereinafter described as a part of the description of the best mode of the invention.

BRIEF DESCRIPTION OF THE DRAWING

Like reference numerals are used to designate like parts throughout the several views of the drawing, and:

FIG. 1 is a two part view of a linear hydraulic motor embodying the present invention, said view being a longitudinal sectional view, with some components being shown in elevation;

FIG. 2 is an enlarged sectional view taken substantially along line 2—2 of FIG. 1;

FIG. 3 is a sectional view taken substantially along line 3—3 of FIG. 1;

FIG. 4 is an enlarged scale view of the upper left hand portion of FIG. 1, but with the clamping plates and the end portions of certain fluid conveying tubes omitted, such views showing the transfer valve in a closed position;

FIG. 5 is an enlarged scale view of the lower left end portion of FIG. 1, said view showing the transfer valve at such end in an open position;

FIG. 11 is a system diagram.

BEST MODE FOR CARRYING OUT THE INVENTION

Figure 6:
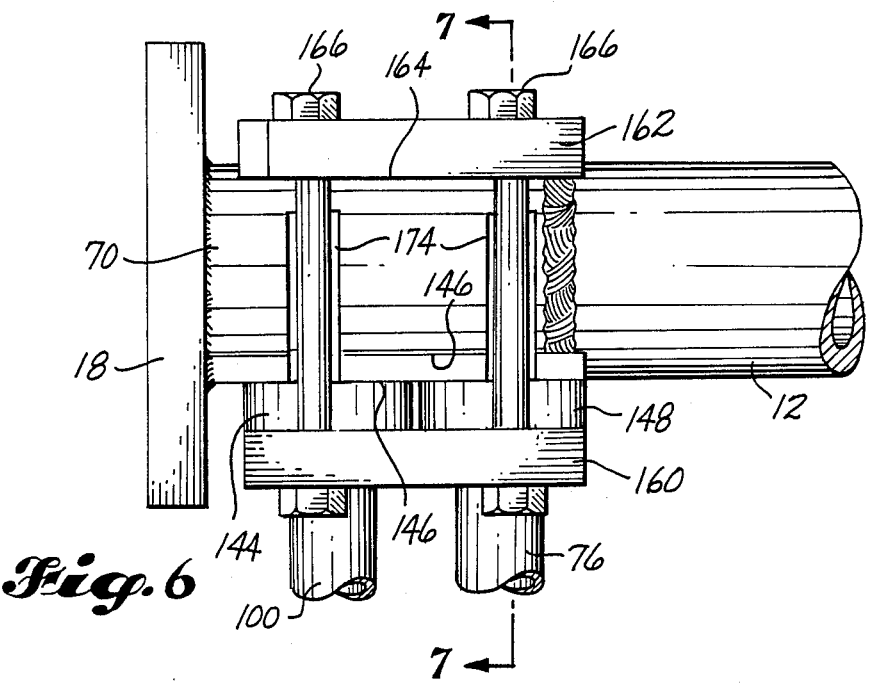
FIG. 6 is a side elevational view of an end portion of the linear hydraulic motor.

FIG. 1 is a two part view of a linear hydraulic motor 10. It comprises a first piston rod 12 having inner and outer ends 14, 16. A mounting pad 18 is connected to the outer end 16. Mounting pad 18 may be bolted or otherwise secured to an end frame structure 20. A first piston head 22 is connected to the inner end of the piston rod 20.

The linear hydraulic motor 10 also includes a fixed second piston rod 24 having inner and outer ends 26, 28. A mounting pad 30 is connected to the outer end 28. Mounting pad 30 is bolted or otherwise secured to a second end frame member 32. A second piston head 34 is connected to the inner end of piston rod 24.

In a given installation the end frame members 20, 32 are fixed in position at spaced apart locations.

A cylinder housing 36 is mounted to travel on the piston heads 22, 34. Cylinder housing 36 includes first and second end members 38, 40. Each end member 38, 40 is suitably connected to its end of the piston housing 36. End member 38 includes a central opening 42 through which piston rod 12 extends. It also includes oil and dirt seals for sealing between it and the piston rod 12. In like fashion, end member 40 includes a central opening 44 through which piston rod 24 extends. It also includes oil and dirt seals for sealing between it and the piston rod 24.

In preferred form the cylinder housing 36 is composed of two equal length sections 46, 48 and a center divider wall 50. Divider wall 50 may be a disc to which the inner ends of the sections 46, 48 are welded, in the manner illustrated.

A first fluid chamber 52 is formed within the cylinder housing 36 between the first end member 38 and the first piston head 22. A second fluid chamber 54 is formed within the cylinder housing 36 between the first piston head 24 and the divider wall 50. A third fluid chamber 56 is formed within the cylinder housing 36 between the divider wall 50 and the second piston head 34. A fourth fluid chamber 58 is formed within the fluid chamber 36 between the second piston head 35 and the second end member 40.

The divider wall 50 includes a first passageway 60 having an inner end communicating with the third chamber 56 and an outer end. The divider wall 50 also includes a second passageway 61 haing an inner end communicating wtih the second chamber 54, and an outer end. A first conduit 62 extends through the first piston rod 12 and has an inner end in communication with the second chamber 54, and an outer end. A second conduit is interconnected between the first chamber 52 and the outer end of the first passageway 60 in the divider wall 50. A third conduit is interconnected between the outer end of the second passageway 61 in the divider wall 50 and the fourth chamber 58. A fourth conduit 68 extends through the second piston rod 24 and has an inner end in communication with the third chamber 56, and an outer end.

Preferably, the second and third conduits 64, 66 are lengths of rigid tubing having right angle bends at their ends. The ends of the tubing may be welded to wall portions of the cylinder housing sections 46, 48 and to the periphery of the divider wall 50.

The piston rods 12, 24 are shown to include separate end pieces 70, 72. These end pieces 70, 72 house transfer valves which are identical in construction. The purpose of each transfer valve is to communicate fluid flow from a chamber of an adjoining linear hydraulic motor with the outlet passageway of motor 10 which is connected to return pressure. FIG. 11 is a schematic diagram of a system which includes three linear hydraulic motors. This system is described below.

Referring to FIG. 3, port 74 is an inlet/outlet port, depending on the direction of fluid movement. A conduit 76 is connected to the port 74. The end piece 70 includes a wall 78 in which a transfer port 80 is provided. A first valve chamber 82 is defined on the side of wall 78 opposite the passageay 62. A second valve chamber 84 is defined within a guide tube 86 which receives a rear piston portion 88 of a valve plug member 90. Valve plug member 90 includes a head end 92 which is directed towards the port 80. Valve plug member 90 is formed to include a longitudinal center passageway having a first diameter outer portion and a smaller diameter inner portion. A shoulder 92 is formed where the two portions meet. This shoulder 92 forms a valve seat for a ball valve 94. A spring 96 is positioned between the ball element 94 and the base of chamber 82. The spring 96 biases the ball 94 against the seat 92 and further biases the valve plug member 90 into a position seating its head end 90 within the port 80, in a manner closing the port 80. End piece 70 includes a side port 98 which is connected to a conduit 100. Conduit 100 is connected to an inlet/outlet port of an adjoining linear hydraulic motor 10'. Guide tube 86 includes a side opening 102 which connects chamber 84 with the port 98. The head 92 of valve plug member 90 includes a first surface 104 having a radial component and a radial surface 106. Radial surface 106 is larger in area than the radial component of surface 104.

The small diameter end of the passageway in the valve plug member 90 recieves an end portion 108 of an operator rod 110. This end portion 108 of the operator rod 110 includes a flattened side for the purpose of defining a fluid passageway 112 between such side and the sidewall of the passage within valve plug 90.

The upper portion of FIG. 1 shows the operator 110 extending through the passageay 62. It further shows it to include an end portion 112 which projects outwardly beyond the inner end of piston head 22 when the piston head 22 is spaced from the divider wall 50.

Preferably, operator 110 is constructed from a rod material which is substantially smaller in diameter than the passageway 62 so that it will not interfere much with the flow of fluid through the passageway 62. Preferably, rod 110 is configured to have a straight section 114 at its outer end. It then makes a bend at 116 and throughout at section 118 angles over to acontact point 120 with a sidewall portion of the passageway 62. It then angles again and extends through a section 122 to a second contact point 124. From there it angles again and extends through a section 126 to a third contact point. From there it angles and extends through a section 130 to a point 132 at the center of the passageway 62. From point 132 it straightens out and extends along the axial center of passageway 62, as an end section 134. Section 114 and section 134 are coaxial with each other and coaxial with the center of the passageway 62. Contact points 120, 124, 128 are located 120° apart. This arrangement allows the end portions 114, 112, to lie on the center of the passageway 62 without requiring the use in the passageway 62 of anything that is larger in diameter than the rod 110. Although the term "contact points" has been used to describe points 120, 124, 128, it is to be understood that in a given installation all three points may not make contact at the same time. It is only necessary that there be sufficient contact to result in the end portions 114, 134 being substantially centered.

The right end of the linear hydraulic motor 10, as shown both in FIGS. 1 and 5, is identical to the left end of the linear hydraulic motor 10. Therefore, a full description of the parts and there relationship to each other will not be repeated. The same reference numerals are used in FIG. 4 except prime symbols are associated with them.

FIG. 1 shows the housing 36 shifted in position to where the center wall 50 is adjacent piston head 34. Shorftly before the illustrated position is reached, the center wall 50 makes contact with the inner end 112'of the operator rod 110'. At the time of contact the end 112' is positioned to extend beyond the inner surface of the piston head 36, in the same manner that end 112 projects beyond the inner surface of piston head 22, in the upper portion of FIG. 1. Following contact, further movement of center wall 50 causes a displacement of the operator rod 110', to the right as illustrated. Referring to FIG. 5, the initial movement of rod 110' pushes valve ball 94' off from its seat 92'. This communicates the chamber 84' with the return port 136. Return port 136 is connected to a conduit 138 which in turn is connected to return pressure. At this time there is elevated pressure in conduit 140. This pressure is communicated via port 142 to transfer valve chamber 82'. When valve plug 92' is seated within the port 80', the elevated pressure in chamber 82' is communicated with the chamber 84' via port 102'. However, when valve plug member 92' is unseated, the elevated pressure in chamber 84' is vented through passageway 112' to passageway 68, port 136 and conduit 138. The elevated pressure entering via port 142 acts on radial surface 106' and also acts on surface 104'. Radial surface 106' is larger than the radial component of surface 104', creating an area differential. This results in the production of an unbalanced force acting on valve plug member 90', for moving it to the right (as pictured). This movement is a quick snap movement. The valve plug 90' snaps over to the right. This unseats the head 92' from the port 80'. As soon as port 80' is opened, fluid pressure and flow from conduit 140 can flow through port 80' and then through port 136 and conduit 138 to a return tank RT (FIG. 11).

When the direction of flow is reversed, and system pressure is supplied via conduit 138 to port 136, there is elevated pressure in passageway 68. This pressure acts to move the cylinder housing 36 to the left (as pictured). The elevated pressure also acts on valve plug member 92' to keep it in the position shown by FIG. 5, so as to maintain port 80' open. Owing to this arrangement, system pressure entering through conduit 138 will flow through passageway 68 and will also flow through port 80', port 142 and conduit 140, and into a chamber in an adjoining linear hydraulic motor.

Referring to FIGS. 6-11, conduit 100 is shown to extend between a switching circuit 142 and port 98. Conduit 100 includes an end piece 144 which fits against a flat side surface 146 of end piece 70. Conduit 76 is a U-shaped section of rigid tubing. It has an end piece 148 at one of its ends and an end piece 150 at its opposite end. End piece 148 is also positioned against flat surface 146. A clamp plate 160 bears against end pieces 144, 148. A second clamp plate 162 is located on the opposite side of the end piece 70. It bears against flat surface 164. A plurality of nut and bolt assemblies 166 extend between and interconnect the two clamp plates 160, 162.

Each of the conduits connecting to side ports in the outer end portions of the piston rods 12, 24 includes the same type of end piece. For example, in FIG. 5, conduit 138 is shown to have an end piece 168. Conduit 140 is shown to have an end piece 170. Each end piece includes an annular groove on its side facing the flat side surface of the end portion of the piston rod in which an O-ring seal 172 is provided (FIG. 5). The O-ring seals 172 seal against leakage between the end portions and the flat side surface.

Figure 7:
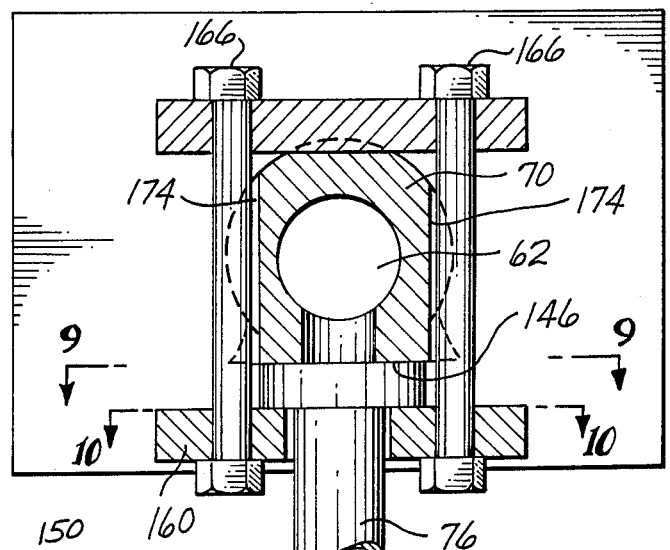
FIG. 7 is a sectional view taken subtantially along line 6—6 of FIG. 5.
Figure 8:
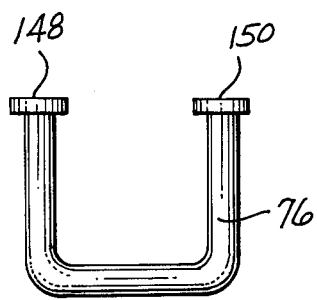
FIG. 8 is a side elevational view of a U-shaped section of tubing.
Figure 9:
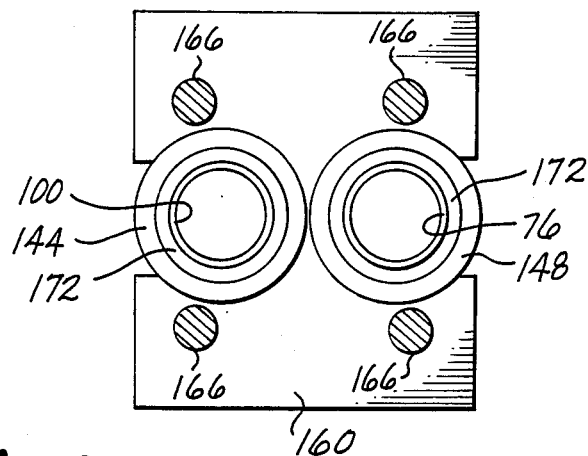
FIG. 9 is a sectional view taken subtantially along line 8—8 of FIG. 7.

As shown by FIG. 7, the end portions of the piston rods include grooves 174 for accommodating portions of the bolt portions of the nut and bolt assemblies 166. Corner openings are provided in the clamp plates 160, 162 to receive the bolts.

Figure 10:
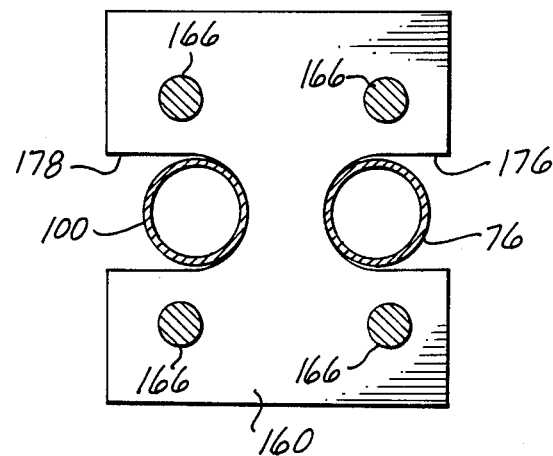
FIG. 10 is a section view taken subtantially along line 9—9 of FIG. 7.

As shown by FIG. 10, the clamp plate 160 includes recesses 176, 178 on its sides for accommodating the tubes 76, 100. Portions of plate 160 bordering the recesses 176, 178 bear against the end pieces 144, 148.

It is the use of hollow piston rods 12, 24 which makes it possible to use the sidewall ports, and to use a simple clamping system for securing the tubing in place. The use of this type of clamp system makes it easy and fast to assemble and disassemble a given hydraulic unit. The use of four expansible chambers, connected together in pairs, makes it possible to provide a substantial amount of linear force producing area with a relatively small diameter cylinder housing. The reduction in the diameter of the cylinder housing reduces size and weight.

Referring to FIG. 11, three hydraulic units 10, 10', 10" are shown connected together as part of a system for driving a reciprocating floor conveyor. Each unit 10, 10', 10" is connected to an independent cross beam. Each cross beam is connected to a different one third of the floor members. When the switching mechanism is operated to connected conduit 138 to pressure furnished by a pump P, while connecting conduit 100 to the return tank, the pressure and flow in conduit 138 enters into passageway 68 of cylinder 100 and from there into chamber 56, and from chamber 56 through port 60 and conduit 64 to chamber 52. The pressure acts against the valve plug member 92', causing it to function like a standard check valve. The valve plug member is moved against the force of spring 96, to allow hydraulic pressure and flow to be transferred via transfer port 80' to conduit 140 leading to a sidewall port in piston rod 24 of unit 10'. The hydraulic pressure and flow act on the valve plug member 92' of this unit, forcing it open, so that pressure and flow can be communicated to conduit 180 leading over to a side port in piston rod 24 of unit 10". Thus, hydraulic pressure and flow move into the chambers 56 and 52 of all three units 10' at one time, while the opposite chambers 54, 58 are vented via passageways 66, 62, 100, to the return side of the switching circuit 142. All three units and the drive beams and floor members connected thereto are moved in unison, in a conveying direction. When the units 10, 10', 10" reach the ends of their paths of travel, the switching circuit operates to connect system pressure to conduit 100 and to connect conduit 138 to the return tank RT. Chambers 56 and 52 of unit 10 are immediately vented to return line 138. Therefore, unit 10 immediately moves back to its original position, moving with it its drive beam and its floor members. The transfer valves maintain fluid in chambers 52 and 56 of units 10', 10". Therefore, these units do not move. However, as unit 10 reaches the end of its path of travel, the end portion 112' of actuator rod 110 is contacted by divider wall 50, in the manner previously described. Endwise outward movement of rod 110 causes the transfer valve at the outer end of piston rod 24 to open. In this manner, chambers 52 and 56 of unit 10' is connected to the return line 138, via such transfer valve. Unit 10' responds by moving back to its original position, moving with it its drive beam and its floor members. As before, when unit 10' reaches the end of its path of travel, the divider wall 50 contacts the end 112' of actuator rod 110, moving it outwardly. This opens the transfer valve at the outer end of piston rod 24 of unit 10'. The opening of this transfer valve communicates chambers 52, 56 of unit 10" with the return circuit 138, via conduits 140, 180 and the two transfer valves. Unit 10" responds by moving back to its original position. It moves with it its drive beam and the floor members attached to such drive beam. When unit 10' reaches the end of its path of travel, the switching circuit is operated to again reverse the direction of pressure and flow delivery to the lines 100, 138, and the cycle is repeated.

Although the combined cylinder and transfer valve of the present invention has been disclosed as a part of a system for driving a reciprocating floor conveyor, it is believed that such cylinder and transfer valve have utility in other installations as well.

The example which has been illustrated and described is provided for example purposes. It is not to be used to limit the scope of the invention and protection. The invention is defined by the claims which follow, interpreted in accordance with patent claim interpretation, including the use of the doctrine of equivalents.

What is claimed is:

1. A combined linear hydraulic motor and transfer valve, comprising:
   a fixed first piston rod having inner and outer ends;
   a fixed second piston rod having inner and outer ends;
   a first piston head at the inner end of said first piston rod;
   a second piston head at the inner end of said second piston rod;
   said first and second piston heads being spaced apart when in use;
   a cylinder housing mounted to travel on said first and second piston heads;
   said cylinder housing having first and second end members;
   said first end member including a central opening through which the first piston rod extends;
   said second end member including a central opening through which the second piston rod extends;
   said cylinder housing including a divider wall between its ends;
   wherein a first fluid chamber is formed within said cylinder housing between said first end member and said first piston head;
   wherein a second fluid chamber is formed within said cylinder housing between said first piston head and the divider wall;
   wherein a third fluid chamber is formed within said cylinder housing between said divider wall and said second piston head;

wherein a fourth fluid chamber is formed within said cylinder housing between said second piston head and said second end member;

said divider wall including a first passageway having an inner end communicating with said third fluid chamber, and an outer end;

said divider wall also including a second passageway having an inner end communicating with said second fluid chamber, and an outer end;

first conduit means extending through said first piston rod and having an inner end in communication with said second fluid chamber, and an outer end;

second conduit means interconnected between said first fluid chamber and the outer end of the first passageway in said divider wall;

third conduit means interconnected between the outer end of the second passageway in said divider wall, and the fourth fluid chamber;

fourth conduit means extending through said second piston rod and having an inner end in communication with said third fluid chamber, and an outer end, a pair of spaced apart ports in sidewall portions of the second piston rod, adjacent its outer end, a transverse wall inside of said fourth conduit means positioned axially between the two ports, said transverse wall including a transfer port;

a valve plug member within said fourth conduit means axially outwardly of said transfer port, said valve plug member having a plug end portion directed towards said transfer port;

spring means endwise outwardly of said valve plug member, biasing said plug end portion into seated engagement with the transfer port; and elongated operator rod means extending through said fourth conduit means, from said valve plug member to the inner end of said fourth conduit means, said actuator rod means having an inner end portion which projects into said third fluid chamber, into a position to be contacted by the divider wall when fluid is being removed from said third fluid chamber and said divider wall is moving toward said second piston head, with contact of the divider wall with the inner end of said rod pushing said rod endwise outwardly, and means responsive to such outward movement of the actuator rod for unseating said valve plug to open the transfer port and communicate each of the sidewall ports with the other, via the transfer port.

2. The combination of claim 1, wherein the valve plug member includes an axial passageway, said passageway including an outwardly facing valve seat intermediate its ends, and a check valve closure element positioned in the passageway outwardly of the valve seat, spring means normally biasing the check valve closure element in a seated position against the valve seat, and wherein the outer end portion of the actuator rod extends into said passageway in the valve plug member, towards said check valve closure element, wherein the said outward movement of the actuator rod means moves the actuator rod means against the check valve closure element, unseating such check valve closure element, and communicating via said axial passageway a region endwise outwardly of the valve plug member with the sidewall port in the second piston rod which is located on the inner side of the transfer port, and wherein said valve plug member includes an area differential resulting in elevated pressure at the sidewall port on the outside of the transfer port, acting on the area differential, to move the valve plug member axially outwardly, to open the transfer port.

3. The combination of claim 2, further comprising a tubular socket aligned axially with the second piston rod, wherein the valve plug member includes an outer end portion which is slidably received within said socket, and wherein said spring is located in said socket, and passageway means communicating the region of such socket outwardly of said valve plug member with the sidewall port that is outwardly of the transverse wall.

4. The combination of claim 1, wherein the elongated actuator rod means has a cross sectional dimension subtantially smaller than the cross sectional dimension of the fourth conduit means, wherein said elongated actuator rod means has coaxial inner and outer end portions which are substantially centered within the fourth conduit means, and said actuator rod means includes bent portions between said end portions which make contact with inner wall portions of the fourth conduit means, for supporting said end portions in substantially centered positions in the fourth conduit means.

5. The combination of claim 4, wherein said actuator rod means includes a portion extending from its inner end portion outwardly to a contact point with the inner wall of the fourth conduit means, followed by a second portion which extends from said first contact point over to a second contact point spaced both axially and angularly from the first contact point, and a third section which extends from the second contact point to a third contact point spaced both axially and angularly from both the first and second contact points, and a fourth portion which extends from the third contact point to the outer end portion.

* * * * *